UNITED STATES PATENT OFFICE.

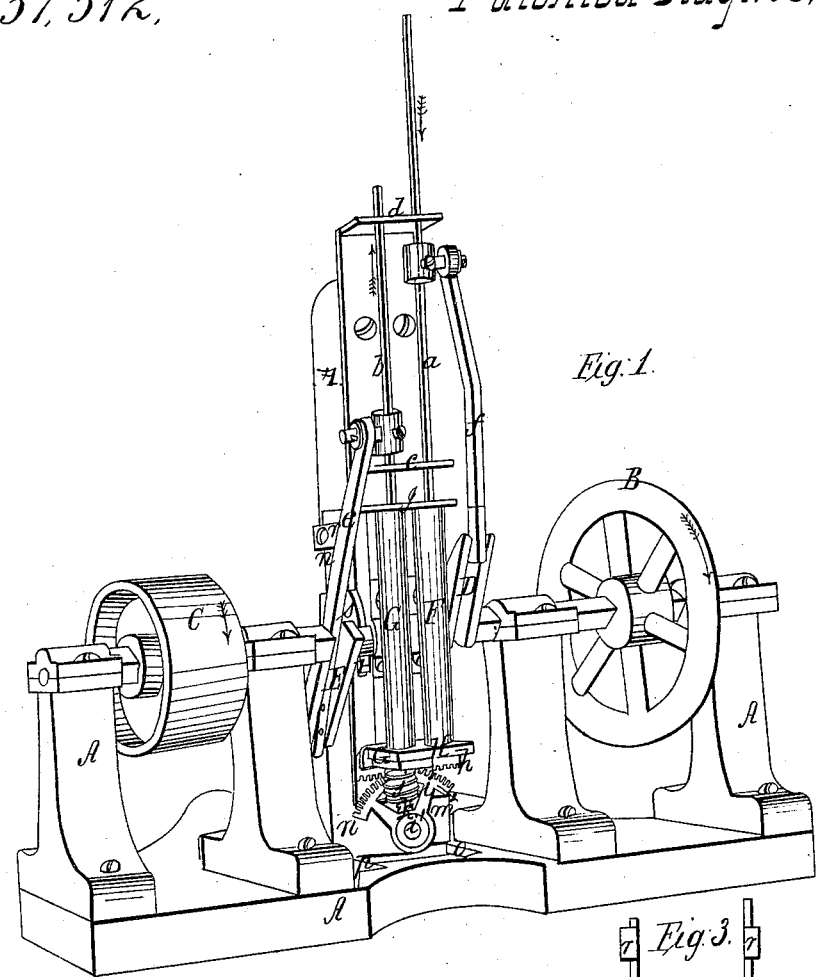
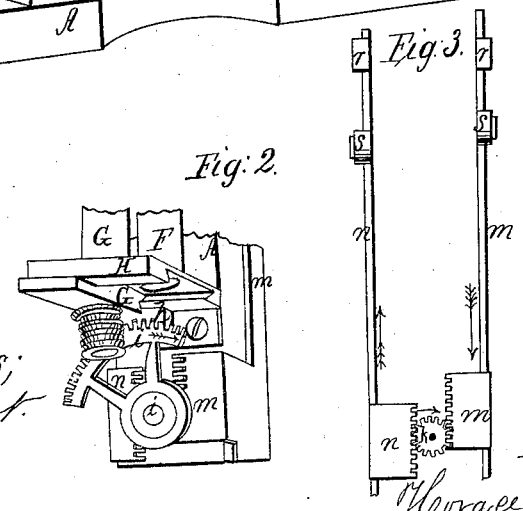
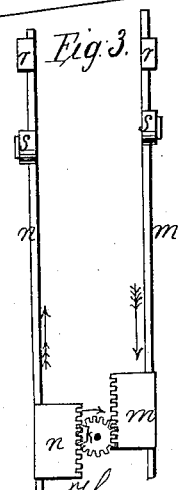

HORACE HUBBELL, OF NEW HAVEN, CONNECTICUT.

IMPROVEMENT IN HYDRAULIC ENGINES.

Specification forming part of Letters Patent No. 57,512, dated August 28, 1866.

*To all whom it may concern:*

Be it known that I, HORACE HUBBELL, of the city and county of New Haven, in the State of Connecticut, have invented a new and useful Improvement in Hydraulic Engines; and I do hereby declare that the following is a full, clear, and exact description of the construction, character, and operation of the same, reference being had to the accompanying drawings, which make part of this specification, in which—

Figure 1 is a perspective view of the whole engine or apparatus, showing the two water-cylinders, piston-rods, connecting-rods, cranks, &c. Fig. 2 is a perspective view of the toothed sector, racks, &c., which move the connecting-tube of the ascending column of water from one cylinder to the other to produce the alternate operations of the two pistons which work the two cranks. Fig. 3 is a plan of the two racks which work the pinion on the axis or arbor of the sector, so as to give the sector an intermittent vibratory motion to move the water-connection with the two cylinders.

My improvement consists in the use of two hollow cylinders set parallel to each other and open at both ends, in which I fit pistons packed water-tight, and their rods connected with the cranks on the main shaft by suitable connecting-rods, and in the use of a toothed sector, on the axis of which is a pinion, to be worked by two reciprocating racks, so as to give the sector a curvilinear intermittent reciprocating motion, so that its teeth, working in a rack, will shift the movable water-passage alternately from one cylinder to the other, to allow the pressure of the water to force up the piston in one cylinder, while the bottom of the other cylinder is left entirely open to allow the water to fall out as its piston descends.

I make a suitable frame, substantially as shown at A A, &c., Fig. 1, with a main shaft, carrying a fly-wheel, B, a driving-pulley, C, and two double cranks, D and E, set in opposite directions to each other, or one hundred and eighty degrees.

I make the two cylinders F and G by boring and fitting them in the usual way, and of the required size to suit the jet of water to be used, and I secure them to a suitable perforated platform, as shown at H, Figs. 1 and 2, and I secure them at the upper ends by a suitable perforated support to keep them parallel, as I, Fig. 1.

I make pistons in any of the usual ways, so that they may work essentially water-tight by packing or otherwise, and I extend their rods $a$ and $b$ through suitable guides, as at $c$ and $d$, to make them work parallel; and I connect the piston-rods $a$ and $b$ with the two opposite cranks D and E by suitable connecting-rods $e$ and $f$, as represented in Fig. 1, or in any other of the usual ways.

I make and fit a suitable dovetail slide, $g$, Figs. 1 and 2, to work or slide horizontally (and essentially water-tight) in the female dovetail in the under side of the platform H, as shown in Fig. 2 and indicated in Fig. 1. To this dovetail slide $g$ I attach a rack, as $h$, in which the teeth of the sector $i$ work to slide the dovetail $g$ alternately from one cylinder to the other; and in the aperture in this dovetail slide $g$ I secure a proper tubular screw, as shown at $j$, Figs. 1 and 2, to which I attach the flexible water-pipe.

I make the sector $i$ substantially in the form shown in Figs. 1 and 2, and on its axis I fix rigidly a pinion, as $k$, Figs. 3 and 1, which is to be partially revolved by the vertical reciprocating motion of the two upright slides $m$ and $n$, Fig. 3, one of which, $n$, is shown in Fig. 1, and the lower ends or toothed parts of both at $m$ and $n$, Fig. 2. These two uprights $m$ and $n$ slide vertically in suitable guides, as $o$ and $p$ at the bottom, and $r$ at the top, in Fig. 1, and the upper ones are also indicated at $r\ r$ in Fig. 3, and to each of them I attach a bracket or projecting piece, one of which is shown at $s$, Fig. 1, and they are indicated at $s\ s$, Fig. 3, and they are raised alternately by lifters or projections fitted into the main shaft, one of which is seen at $t$, all as represented in Fig. 1 and indicated in the section.

Having made the several parts and arranged and attached them, as before described, I let on the jet of water, which, from its own pipe or hose, will pass through the tubular screw-connection $j$, Figs. 1 and 2, into the cylinder G, and force its piston upward, which, by means of the piston-rod $b$ and the connecting-rod $e$, will carry up the crank E and revolve the driving-pulley C in the direction indicated by the dart; and when the crank E has arrived about at its superior or highest center or culmination the lifter or projection t, by coming in contact with the projecting piece s, will raise the upright n, which will, by the action of its rack at its lower end, revolve the pinion k in the direction indicated by dart in Fig. 3, and so vibrate the sector i to the right, or in the direction indicated by the dart, (leaving the lower end of the cylinder G entirely open for discharging the water,) and thus slide or change the tubular screw or connection j to the lower end of the other cylinder, F, (the piston of which has been let down by the operation of the crank D,) when the jet of water will force up the piston in the cylinder F, and so alternately forcing one piston up while the other is coming down, and thus causing a continuous rotary motion of the driving-pulley C.

I may use four cylinders and their appendages, with the cranks of the additional two set at right angles to those described, if thought best, to obviate the danger of stopping on the center, &c.

What I claim as my invention, and desire to secure by Letters Patent, is—

The combination of the cylinders and their appendages with the sector and its appendages, when the whole is so constructed, arranged, and fitted that the jet of water will alternately be forced into the lower end of one cylinder to act on and elevate its piston, while the lower end of the other cylinder will be entirely open for the discharge of the water and the descending of the piston, substantially as herein described and set forth.

HORACE HUBBELL.

Witnesses:
L. J. MERCHANT,
R. FITZGERALD.